(12) United States Patent
Kamiya et al.

(10) Patent No.: US 7,621,842 B2
(45) Date of Patent: Nov. 24, 2009

(54) BICYCLE HUB ASSEMBLY

(75) Inventors: Mitsuru Kamiya, Sakai (JP); Tetsuya Hino, Sakai (JP)

(73) Assignee: Shimano Inc., Osaka (JP)

( * ) Notice: Subject to any disclaimer, the term of this patent is extended or adjusted under 35 U.S.C. 154(b) by 387 days.

(21) Appl. No.: 11/674,813

(22) Filed: Feb. 14, 2007

(65) Prior Publication Data
US 2008/0194376 A1    Aug. 14, 2008

(51) Int. Cl.
F16H 3/44 (2006.01)
(52) U.S. Cl. .......................... 475/296; 475/330; 192/47
(58) Field of Classification Search .................. 475/277, 475/289, 288, 296, 330
See application file for complete search history.

(56) References Cited

U.S. PATENT DOCUMENTS

| | | | |
|---|---|---|---|
| 3,366,206 A | | 1/1968 | Shimano |
| 5,078,664 A | * | 1/1992 | Nagano ...................... 475/297 |
| 5,322,487 A | | 6/1994 | Nagano |
| 5,562,563 A | * | 10/1996 | Shoge ......................... 475/298 |
| 5,855,530 A | * | 1/1999 | Huang et al. ................ 475/289 |
| 5,964,678 A | * | 10/1999 | Hanada et al. .............. 475/297 |
| 6,083,136 A | * | 7/2000 | Shoge ......................... 475/297 |
| 6,202,813 B1 | | 3/2001 | Yahata et al. |
| 6,533,700 B2 | * | 3/2003 | Shoge ......................... 475/275 |
| 6,607,465 B1 | * | 8/2003 | Shoge ......................... 475/297 |
| 6,641,500 B2 | | 11/2003 | Shoge |
| 7,148,582 B2 | * | 12/2006 | Matsueda et al. ........... 290/1 C |
| 2002/0183159 A1 | * | 12/2002 | Okochi ....................... 475/269 |
| 2003/0017905 A1 | * | 1/2003 | Butz .......................... 475/296 |

* cited by examiner

*Primary Examiner*—David D Le
*Assistant Examiner*—Justin Holmes
(74) *Attorney, Agent, or Firm*—Global IP Counselors, LLP

(57) ABSTRACT

A multi-speed internal bicycle hub transmission assembly includes a hub axle, a driver, a hub shell, a power transmission mechanism, a pawl and a pawl retracting mechanism. The driver is rotatably supported to the hub axle. The hub shell is rotatably supported to the hub axle. The power transmission mechanism is disposed between the driver and the hub shell for transmitting rotational power from the driver to the hub shell through at least a first power transmission path and a second power transmission path. The pawl is configured to transfer torque between the driver and the hub shell with torque being transferred along the first power transmission path. The pawl retracting member is configured to restrict movement of the pawl with torque transmitted along the second power transmission path.

4 Claims, 13 Drawing Sheets

US 7,621,842 B2

BICYCLE HUB ASSEMBLY

BACKGROUND OF THE INVENTION

1. Field of the Invention

This invention generally relates to a bicycle hub assembly with one way clutch that includes a pawl. More specifically, the present invention relates to bicycle hub assembly that includes an internal power transmission mechanism that has at least two power transmission paths where the pawl transmits torque in one power transmission path and does not transmit torque in another power transmission path.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle hub assembly.

Many bicycle hub assemblies include an internal power transmission mechanism having two or more power transmission paths, where each path is defined by unique gear combinations through which torque is transmitted. One such bicycle hub assembly is disclosed in U.S. Pat. No. 6,641,500 (assigned to Shimano Inc.). In the disclosed bicycle hub assembly, the internal power transmission mechanism includes a plurality of planetary gears and ring gears that define a plurality of gear combinations or speeds (power transmission paths) that can be selected by a cyclist for transmission of torque.

Along one power transmission path torque is transmitted from a driver member through a pawl (a one way clutch) to a first ring gear. The ring gear transmits the torque through one of several selected ones of the planetary gear(s) and ring gear(s) at several different ones of the gear combinations.

Similarly, along another power transmission path torque is transmitted without the use of the pawl. Typically, while transmitting torque along the second of the two power transmission paths, the driver member and the first ring gear rotate at different speeds. Consequently, with torque transmitted along the second of the power transmission paths, the pawl ratchets between the driver member and the first ring gear making a clicking noise.

The noise made by the ratcheting movement of the pawl between the driver member and the first ring gear is undesirable to many cyclists. Some cyclists believe it creates drag, wastes energy and causes wear of the pawl and the first ring gear.

In view of the above, it will be apparent to those skilled in the art from this disclosure that there exists a need for an improved pawl configuration that eliminate the noise made by a pawl when the driver member and the ring gear rotate a differing speeds. This invention addresses this need in the art as well as other needs, which will become apparent to those skilled in the art from this disclosure.

SUMMARY OF THE INVENTION

One object of the present invention is to provide an internal power transmission mechanism of a hub bicycle hub assembly with a pawl retracting mechanism that retracts a pawl when not transmitting torque between a driver member and a ring gear.

The foregoing objects can basically be attained by providing a multi-speed internal bicycle hub transmission assembly with a hub axle, a driver, a hub shell, a power transmission mechanism, a pawl and a pawl retracting member. The driver is rotatably supported to the hub axle. The hub shell is rotatably supported to the hub axle. The power transmission mechanism is disposed between the driver and the hub shell for communicating rotational power from the driver to the hub shell through at least a first power transmission path and a second power transmission path. The pawl is configured to transfer torque between the driver and the hub shell with torque being transferred along the first power transmission path. The pawl retracting member is configured to restrict movement of the pawl with torque transmitted through the second power transmission path.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
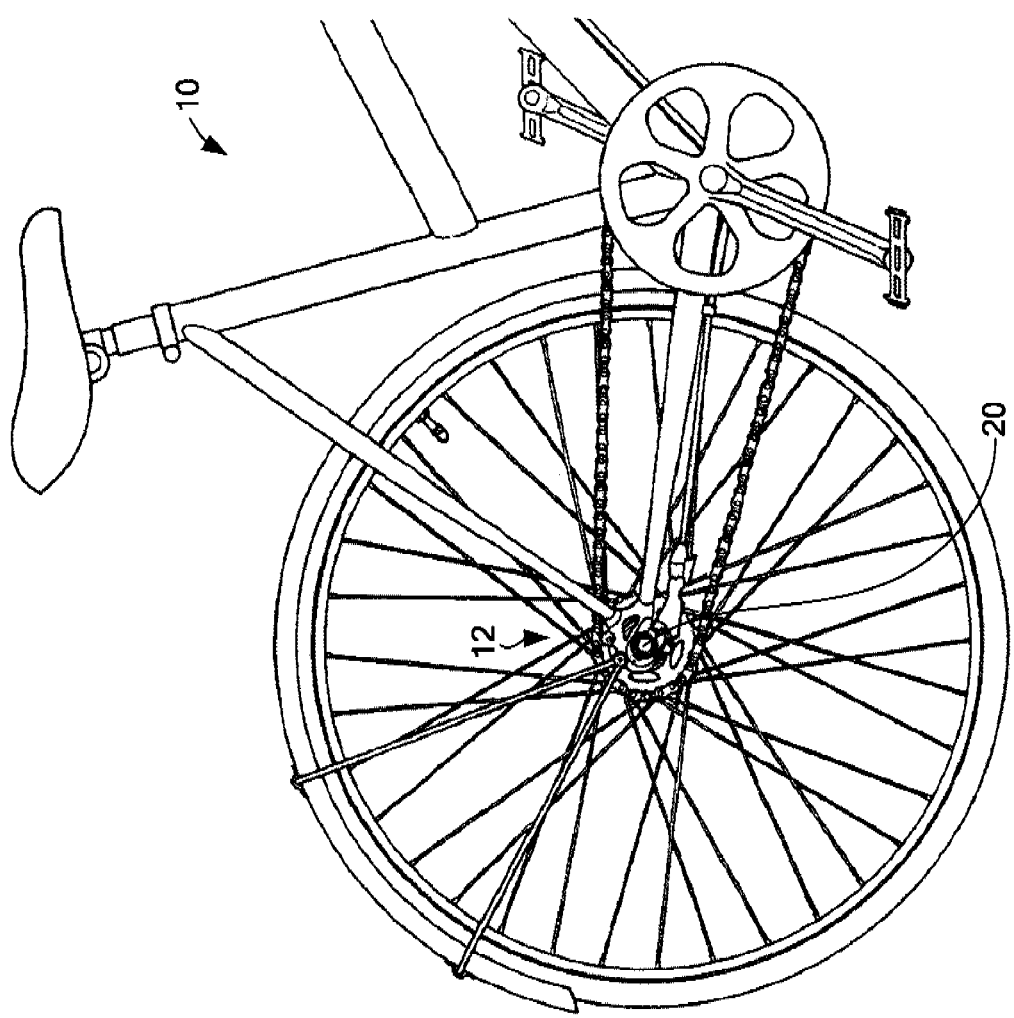
FIG. 1 is a side elevation view of a bicycle showing a rear wheel and hub assembly in accordance with one embodiment of the present invention.
Figure 2:
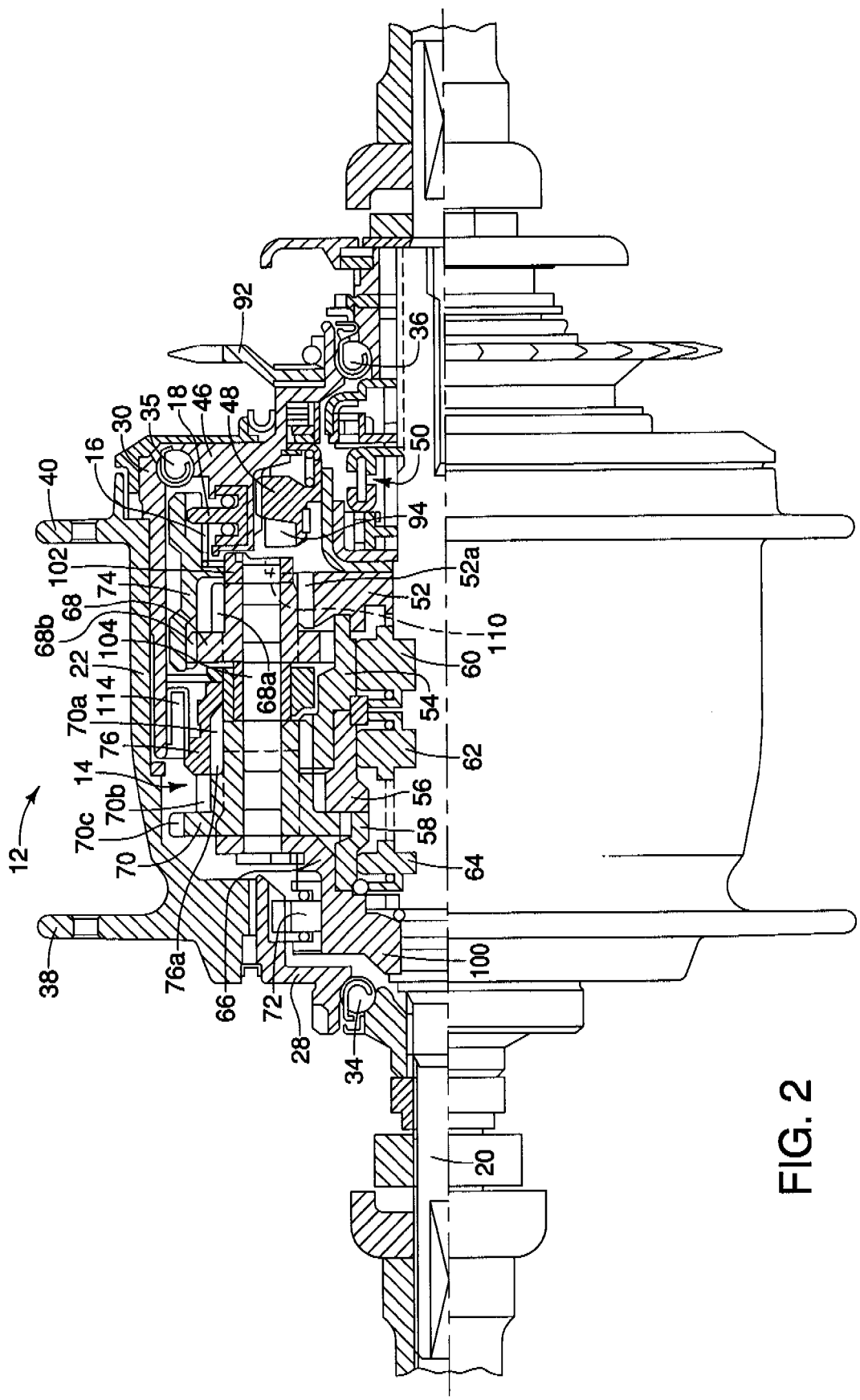
FIG. 2 is a cross-section of the hub assembly showing a power transmission assembly that includes a pawl retracting mechanism in accordance with one embodiment of the present invention.

Referring initially to FIG. 1, a bicycle 10 with a hub assembly 12 is illustrated in accordance with a first embodiment of the present invention. As shown in FIG. 2, the hub assembly 12 includes a power transmission assembly 14 that includes a pawl retracting mechanism 16 that allows a pawl 18 to transmit torque along any of a first group of power transmission paths (FIG. 13-16) and retracts the pawl 18 when torque is transmitted along any of a second group of power transmission paths (FIG. 17-20), as described in greater detail below.

Figure 3:
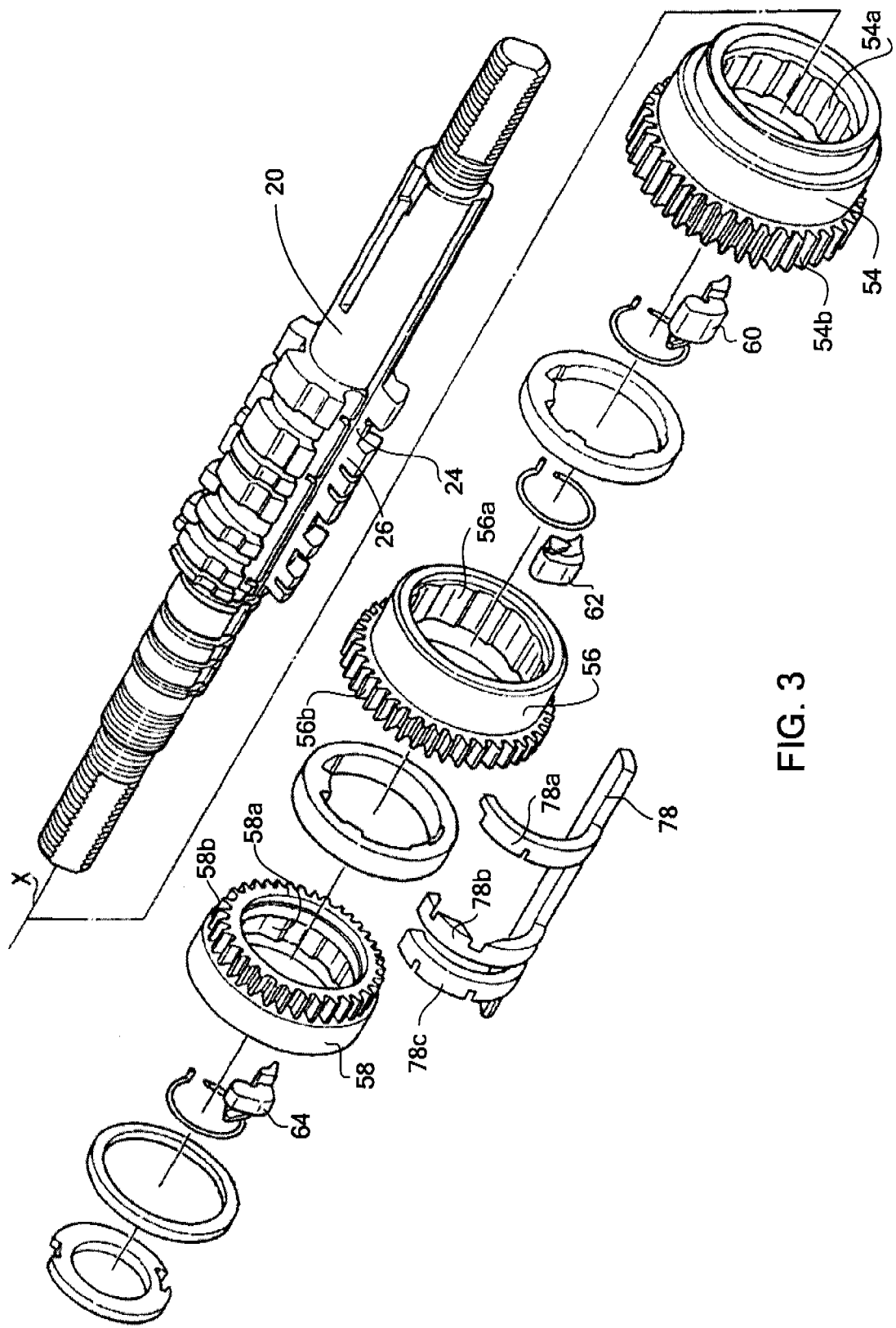
FIG. 3 is a perspective exploded view of a portion of the power transmission assembly showing an axle, several sun gears and a control arm in accordance with one embodiment of the present invention.
Figure 4:
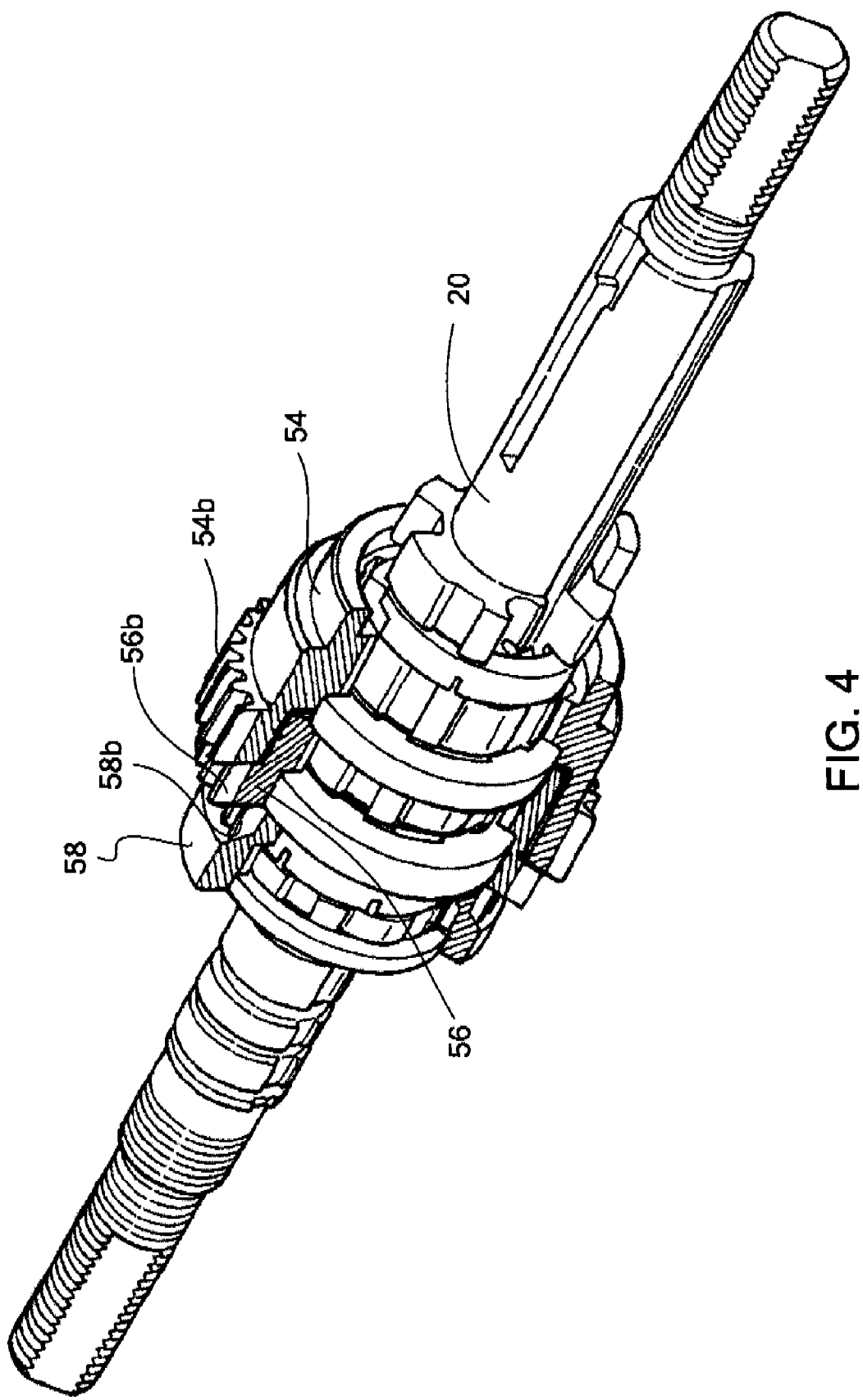
FIG. 4 is a perspective view of the portion of the power transmission assembly depicted in FIG. 3, showing the sun gears and control arm assembled on the axle in accordance with one embodiment of the present invention.

As shown in FIG. 2, the hub assembly 12 basically includes a stationary axle 20, a hub shell 22 and the power transmission assembly 14. As shown in FIG. 3, the axle 20 includes recesses 24 and 26 that are dimensioned for receiving and retaining various portions of the power transmission assembly 14, as described in greater detail below.

Referring again to FIG. 2, the hub shell 22 is rotatably supported about the axle 20 by a left cup 28, a right cup 30 and bearing assemblies 34, 35 and 36. The hub shell 22 further includes spoke flanges 38 and 40. The spoke flanges 38 and 40 are configured to support spokes and an outer wheel rim in a conventional manner. The bearing assembly 34 is disposed between the left cup 28 and the axle 20. The right cup 30 is fixed to the hub shell 22 and extends along a radially inward surface of the hub shell 22. The right cup 30 is rotatably supported by the bearing assembly 35.

The power transmission assembly 14 is a multi-speed internal hub transmission. The power transmission assembly 14 basically includes (among other things) a driver 46, a clutch ring 48, a shift assist mechanism 50, a first sun gear 52, a second sun gear 54, a third sun gear 56, a fourth sun gear 58, a second sun gear pawl 60, a third sun gear pawl 62, a fourth sun gear pawl 64, a planet gear carrier 66, a first set of planet gears 68, a second set of planet gears 70, a pawl 72, a first ring gear 74, a second ring gear 76, a control arm 78, the pawl retracting mechanism 16 and the pawl 18. The power transmission mechanism 14 is operably disposed between the driver 46 and the hub shell 22 for communicating rotational power from the driver 46 to the hub shell 22 through the first group of power transmission paths and the second group of power transmission paths. The first and second groups of power transmission paths are defined in greater detail below.

Figure 6:
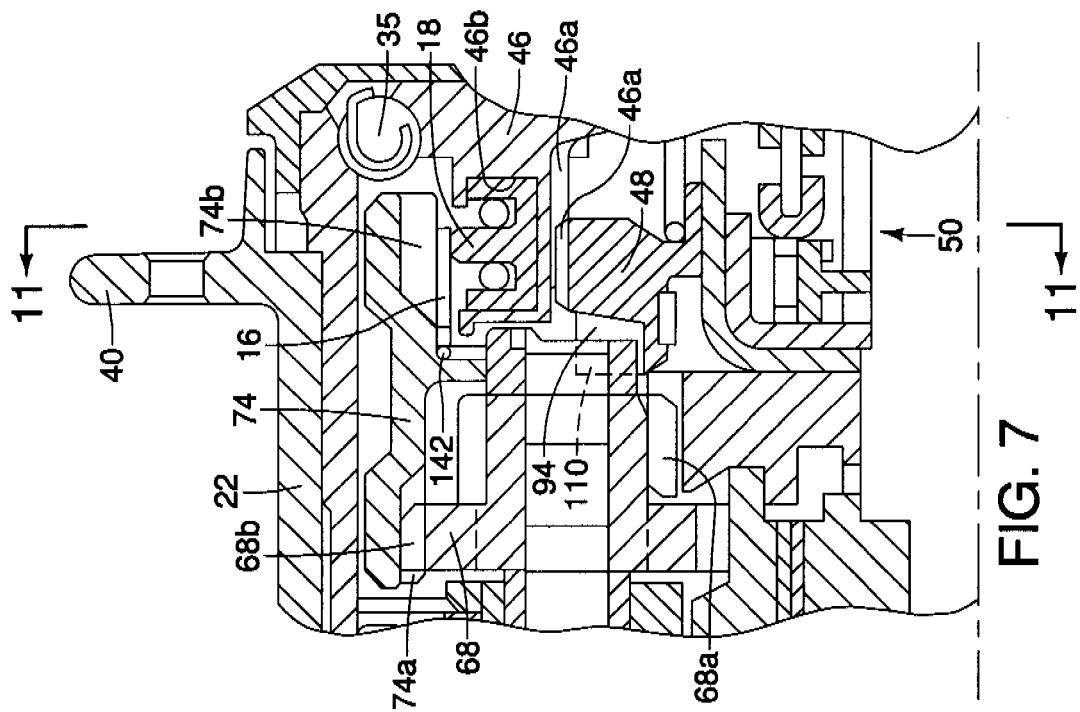
FIG. 6 is a side cross-sectional view of a portion of the power transmission assembly shown in FIG. 2, showing a clutch member in a dis-engaged position, a pawl retracting mechanism in a dis-engaged position and a pawl in a torque transmitting position for transmitting torque between a driver member and a first ring gear in accordance with one embodiment of the present invention.
Figure 7:
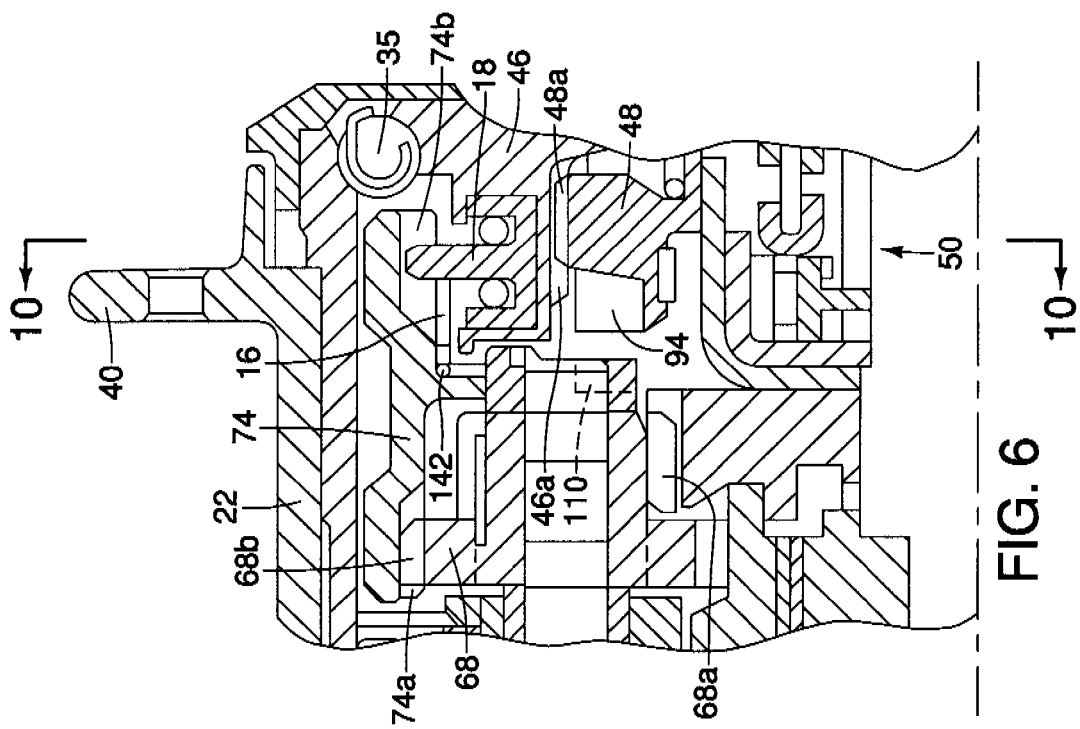
FIG. 7 is a side cross-sectional view similar to FIG. 6, showing the clutch member in an engaged position, the pawl retracting mechanism in an engaged position and the pawl in a retracted position where no torque is transmitted between the driver member and the first ring gear by the pawl in accordance with one embodiment of the present invention.
Figure 12:
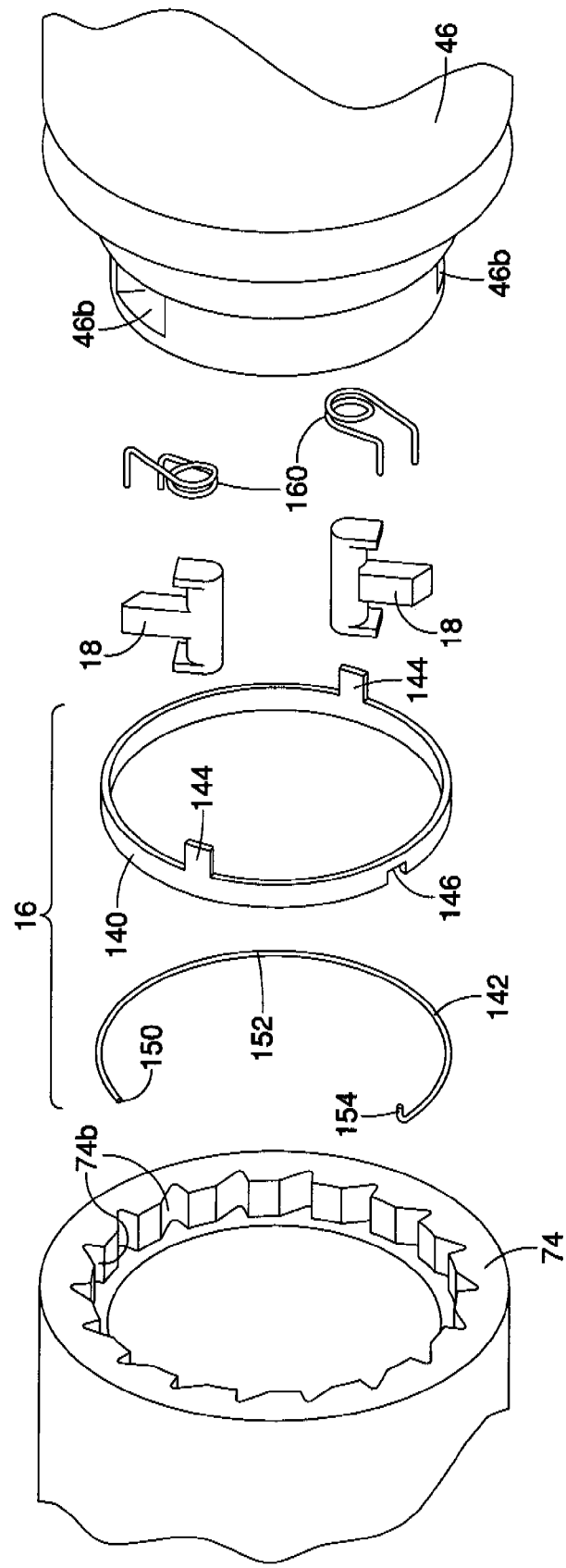
FIG. 12 is an exploded view of a portion of the power transmission assembly showing portions of the pawl retracting mechanism, the first ring gear, the pawl and the driver member in accordance with one embodiment of the present invention.
Figure 13:
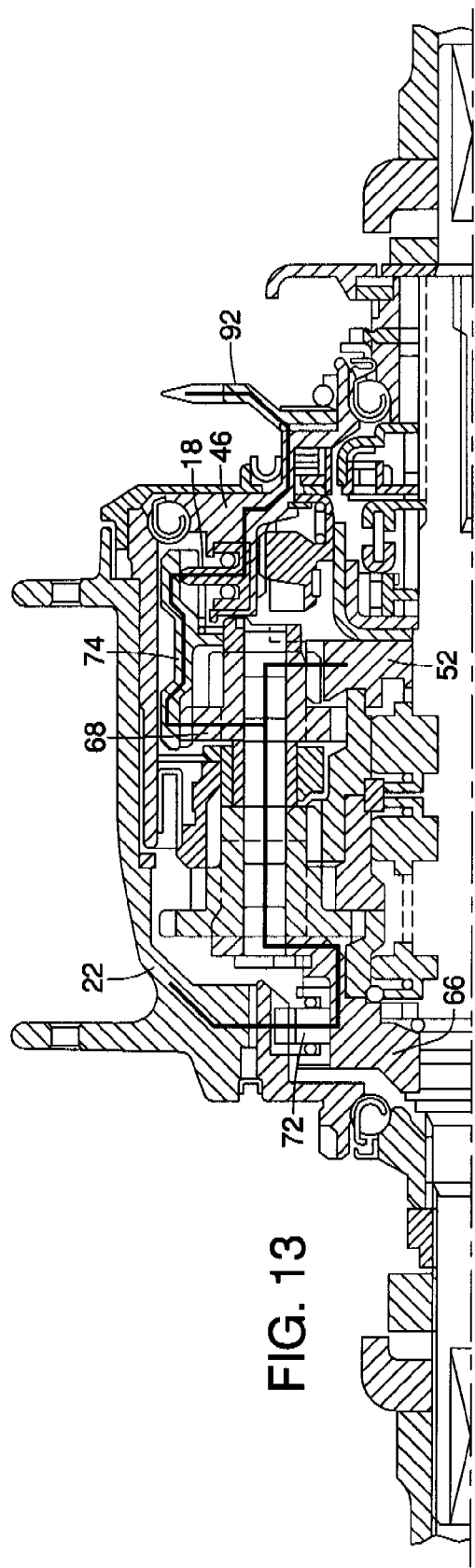
FIG. 13 is a cross-sectional view similar to FIG. 2 showing a first gear transmission path with a first gear speed selected in accordance with one embodiment of the present invention.
Figure 14:
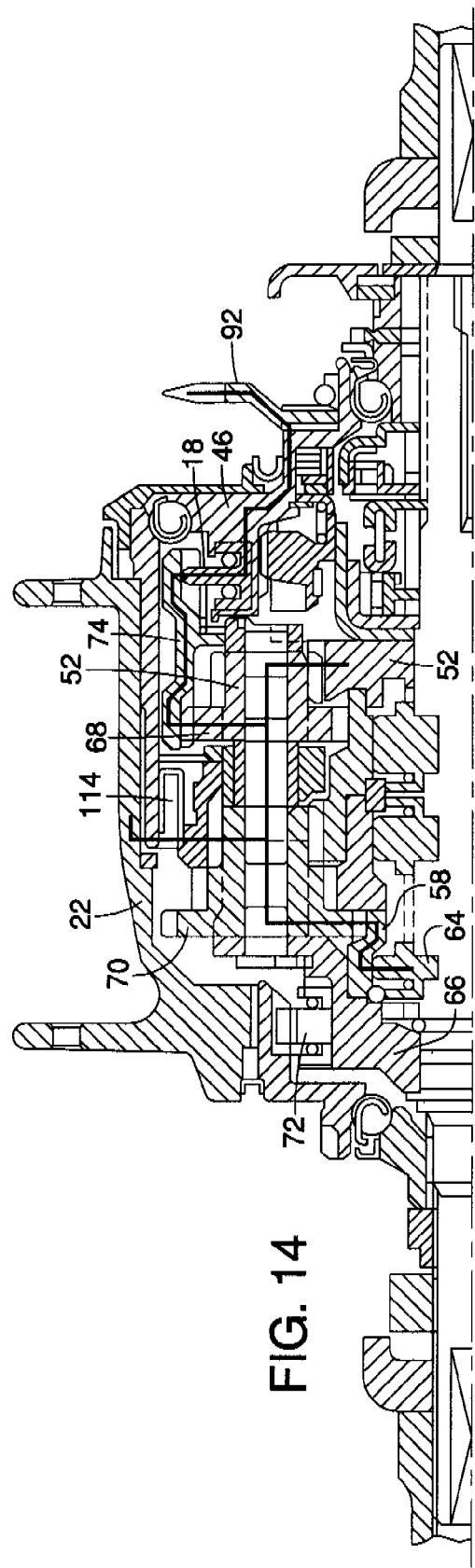
FIG. 14 is a cross-sectional view similar to FIG. 13 showing a second gear transmission path with a second gear speed selected in accordance with one embodiment of the present invention.
Figure 15:
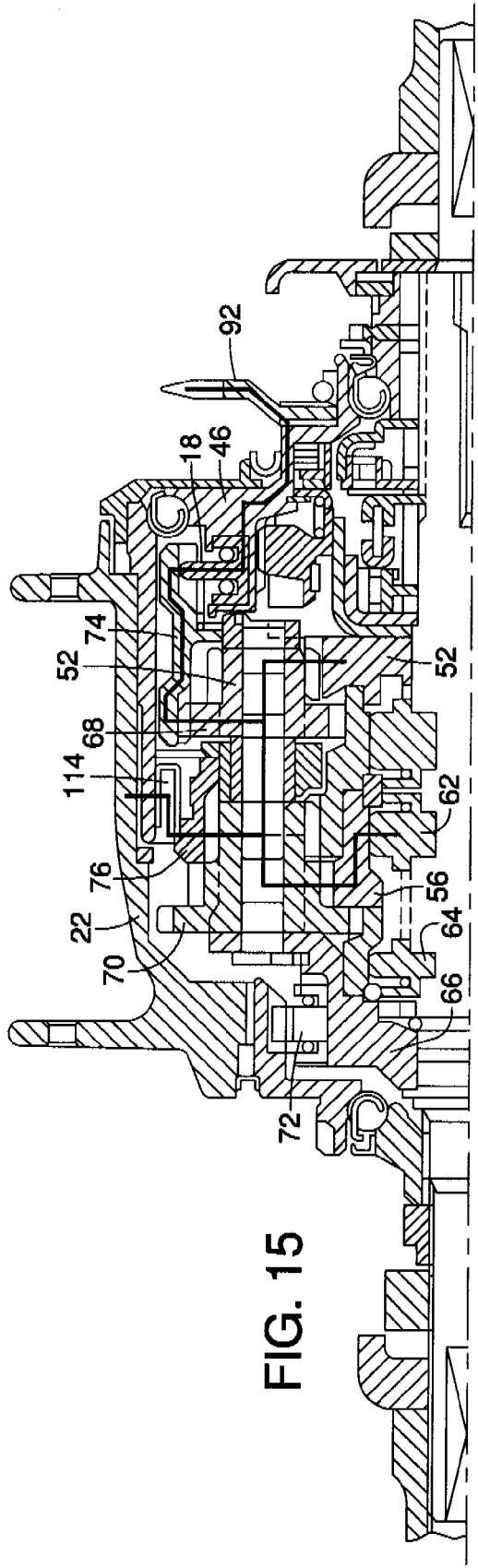
FIG. 15 is a cross-sectional view similar to FIG. 13 showing a third gear transmission path with a third gear speed selected in accordance with one embodiment of the present invention.
Figure 16:
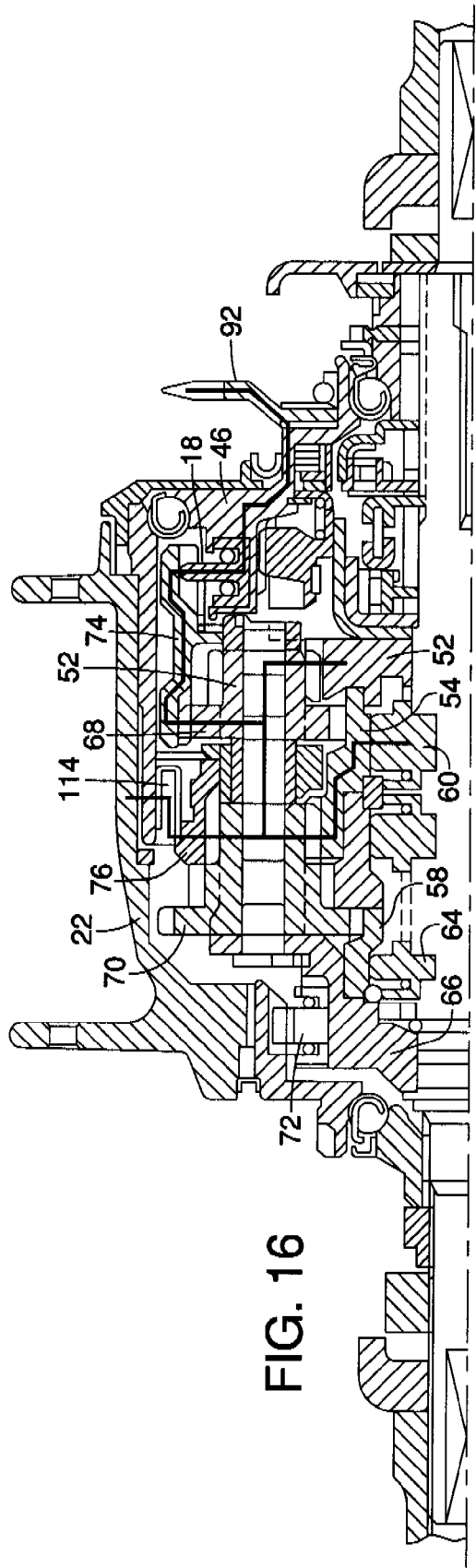
FIG. 16 is a cross-sectional view similar to FIG. 13 showing fourth gear transmission path with a fourth gear speed selected in accordance with one embodiment of the present invention.
Figure 17:
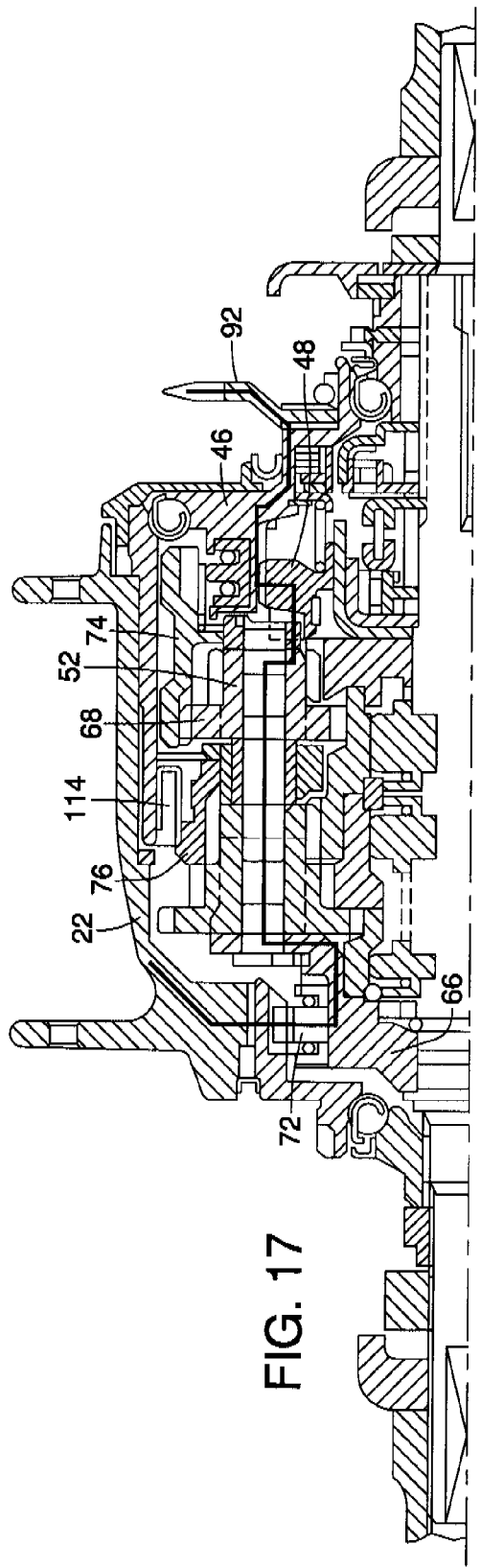
FIG. 17 is a cross-sectional view similar to FIG. 2 showing a fifth gear transmission path with a fifth gear speed selected in accordance with one embodiment of the present invention.
Figure 18:
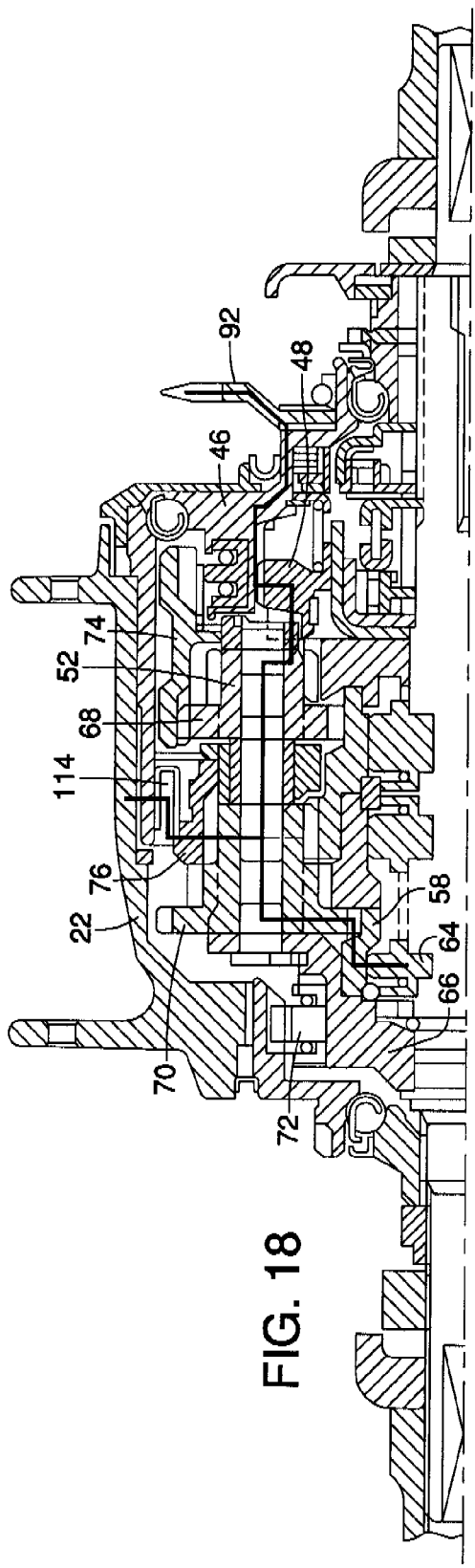
FIG. 18 is a cross-sectional view similar to FIG. 17 showing a sixth gear transmission path with a sixth gear speed selected in accordance with one embodiment of the present invention.
Figure 19:
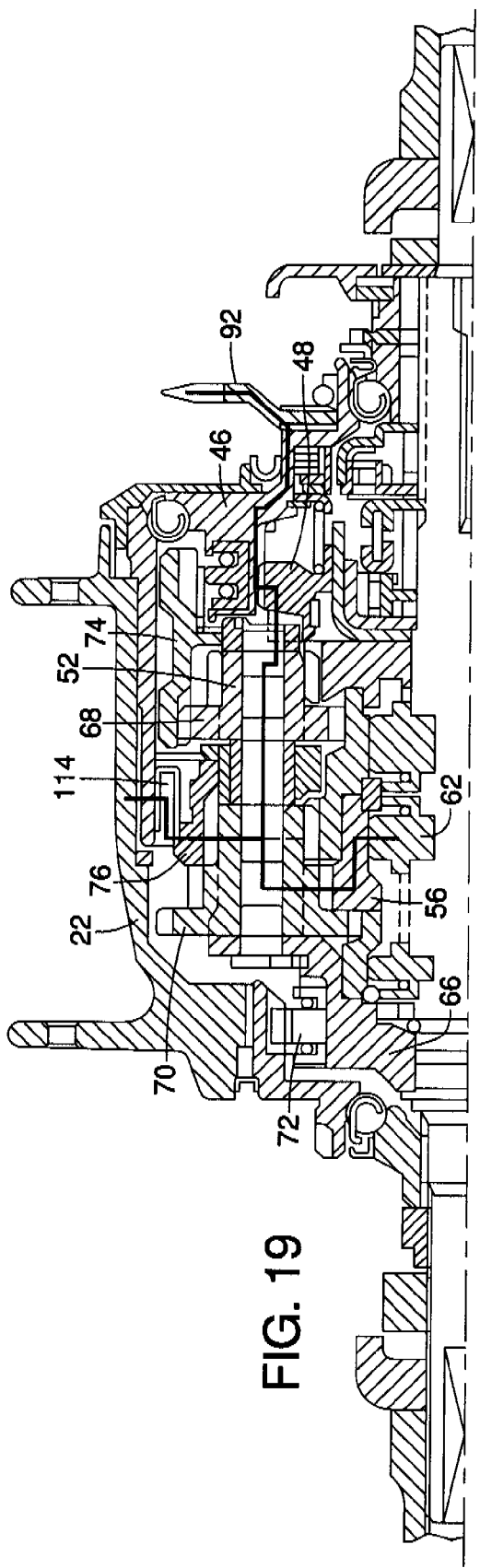
FIG. 19 is a cross-sectional view similar to FIG. 17 showing a seventh gear transmission path with a seventh gear speed selected in accordance with one embodiment of the present invention.
Figure 20:
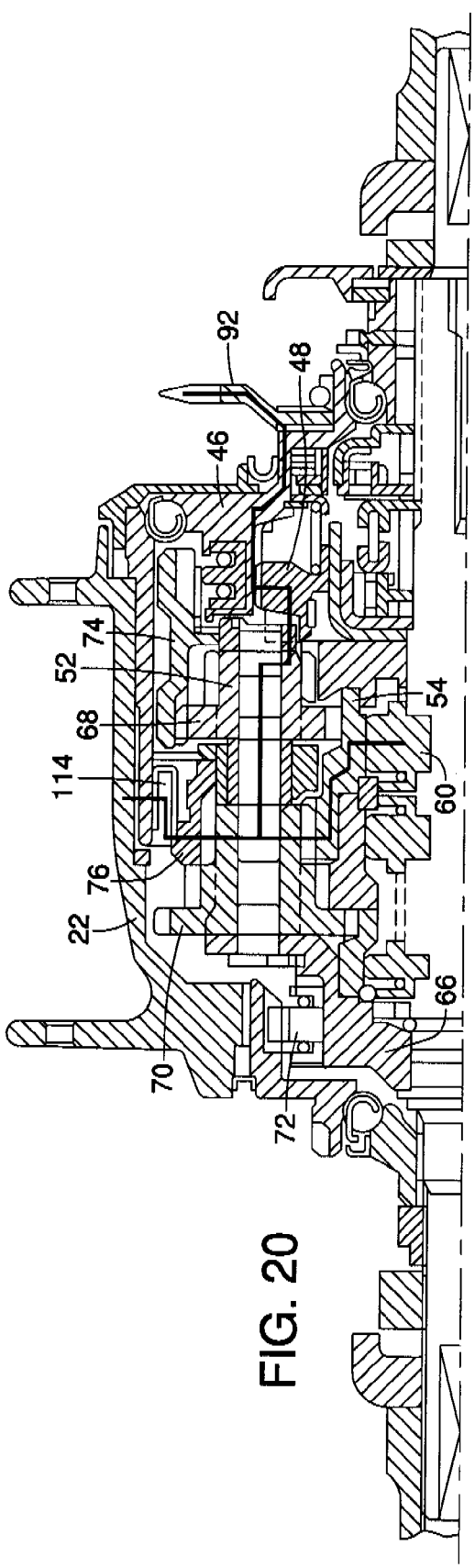
FIG. 20 is a cross-sectional view similar to FIG. 17 showing an eighth gear transmission path with an eighth gear speed selected in accordance with one embodiment of the present invention.

With reference again to FIG. 2, the driver 46 is a generally annular member that is rotatably supported about the axle 20 by the bearing assembly 36. The driver 46 further supports the bearing assembly 35, as shown in FIG. 2. The driver 46 further supports a chain sprocket 92 that is fixedly attached to the driver 46. As best shown in FIGS. 6 and 7, the driver 46 includes internal gear teeth 46a. As best shown in FIG. 12, the driver also includes a pair of pawl recesses 46b. The chain sprocket 92 is configured to receive torque from a cyclists pedaling action. Since the chain sprocket 92 in fixed to the driver 46 torque from the chain sprocket 92 is directly transferred to the driver 46.

As best shown in FIGS. 6 and 7, the clutch ring 48 includes radially outwardly extending gear teeth 48a that mesh with radially inwardly extending gear teeth 46a of the driver 46. The clutch ring 48 also includes splines 94. The clutch ring 48 is movable from a first position shown in FIGS. 2, 6 and 13-16 to a second position shown in FIGS. 7 and 17-20. In the first position shown in FIGS. 2, 6 and 13-20, the clutch ring 48 is idle and rotates with the driver 46. Hence, with the clutch ring 48 in the first position, torque from the driver 46 is transmitted to the first ring gear 74 via the pawl 18 in the first power transmission path, as described in greater detail below. In the second position shown in FIGS. 7 and 17-20, the splines 94 of the clutch ring 48 engage the carrier 66 and torque from the driver 46 is transmitted from the driver 46 to the carrier 66 in the second group of power transmission path, as also described in greater detail below. The clutch ring 48 is moved between the first and second positions in a conventional manner by the shift assist mechanism 50.

The shift assist mechanism 50 is a mechanism that assists in the shifting between various gear ratios (gear combinations), as described in greater detail in, for example, U.S. Pat. No. 6,641,500 to Shoge (assigned to Shimano Inc.). Since operation of the shift assist mechanism 50 and movement of the clutch ring 48 are conventional, description is omitted for the sake of brevity.

Figure 5:
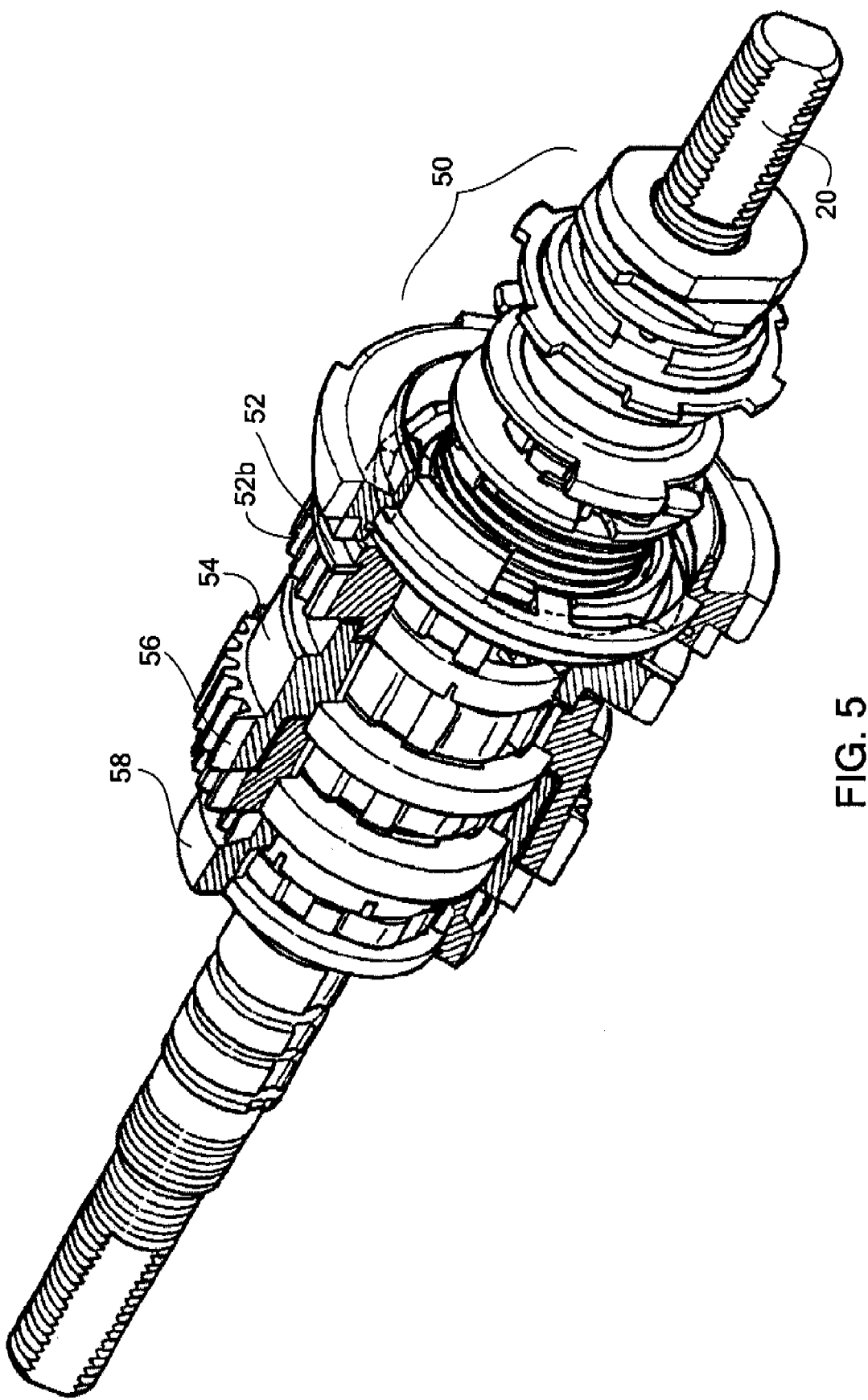
FIG. 5 is a perspective view of the portion of the power transmission assembly depicted in FIGS. 3 and 4, showing the sun gears, control arm and portions of a shift assist mechanism installed on the axle in accordance with one embodiment of the present invention.

The first sun gear 52 is non-rotatably supported on the axle 20 in a conventional manner. The first sun gear 52 includes radially outwardly extending gear teeth 52b (shown in FIGS. 2 and 5).

The second sun gear 54, the third sun gear 56 and the fourth sun gear 58 are all selectively rotatable relative to the axle 20. The second sun gear 54, the third sun gear 56 and the fourth sun gear 58 each have respective internal pawl ratchet teeth 54a, 56a and 58a and respective external gear teeth 54b, 56b and 58b shown more clearly in FIG. 3.

A portion of the second sun gear pawl 60 is non-rotatably retained within the recess 24 of the axle 20 for pivoting or ratcheting movement. Specifically, the second sun gear pawl 60 remains in position relative to the axle 20 and selectively engages the internal ratchet teeth 54a of the second sun gear 54. The second sun gear pawl 60 is selectively operable via control of movement by the control arm 78 in a conventional manner. Mainly, a portion of the control arm 78 is confined to movement within the recess 26 of the axle 20. Engagement and disengagement of portions of the control arm 78 with the second sun gear pawl 60 moves the second sun gear pawl 60 between an operable orientation and a non-operable orientation with respect to the second sun gear 54. With the second sun gear pawl 60 operable, the second sun gear pawl 60 engages the internal ratchet teeth of the second sun gear 54 allowing rotation of the second sun gear 54 in one rotational direction only. In other words, the second sun gear pawl 60 functions as a one-way clutch. With the second sun gear pawl 60 inoperable by engagement with the control arm 78, the second sun gear 54 can freely rotate or freewheel in either rotational direction.

A portion of the third sun gear pawl 62 is also non-rotatably retained within the recess 24 of the axle 20 for pivoting or ratcheting movement. The third sun gear pawl 62 remains in position relative to the axle 20 and selectively engages the internal ratchet teeth 56a of the third sun gear 56. The third sun gear pawl 62 is selectively operable via control of movement by the control arm 78 in a manner similar to control of the second sung gear pawl 60, in a conventional manner. With the third sun gear pawl 62 operable, the third sun gear pawl 62 engages the internal ratchet teeth of the third sun gear 56 allowing rotation of the third sun gear 56 in one rotational direction only. In other words, the third sun gear pawl 62 functions as a one-way clutch. With the third sun gear pawl 62 inoperable by positioning of the control arm 78, the third sun gear 56 can freely rotate or freewheel in either rotational direction.

A portion of the fourth sun gear pawl 64 is also non-rotatably retained within the recess 24 of the axle 20 for pivoting or ratcheting movement. Specifically, the fourth sun gear pawl 64 remains in position relative to the axle 20 and selectively engages the internal ratchet teeth 58a of the fourth sun gear 58. The fourth sun gear pawl 64 is selectively operable via control of movement by the control arm 78 in a conventional manner. With the fourth sun gear pawl 64 operable, the fourth sun gear pawl 64 engages the internal ratchet teeth of the fourth sun gear 58 allowing rotation of the fourth sun gear 58 in one rotational direction only. In other words, the fourth sun gear pawl 64 functions as a one-way clutch. With the fourth sun gear pawl 64 inoperable by engagement with the control arm 78, the fourth sun gear 58 can freely rotate or freewheel in either rotational direction.

The planet gear carrier 66 is an annular shaped member rotatably supported about the axle 20. The carrier 66 is configured to support and retain the first and second sets of planet gears 68 in a conventional manner. The carrier 66 includes a smaller diameter portion 100 and a larger diameter portion 102. As shown at the left hand side of FIG. 2, smaller diameter portion 100 is located adjacent to the bearing assembly 34. The larger diameter portion 102 of the carrier 66 includes a plurality of shafts 104 (preferably three shafts 104 are included, but only one is shown in FIG. 2). The shafts 104 support the sets of first and second planet gears 68 and 70 such that the first and second planet gears 68 and 70 freely rotate about the shafts 104. The larger diameter portion 102 also includes a recess 110 adjacent to the clutch ring 48. Specifically, the recess 110 is configured to engage the spline 94 of the clutch ring 48 with the clutch ring 48 in the second position shown in FIGS. 8 and 14.

The carrier 66 preferably supports three of the first set of planet gears 68 (only one is shown in FIG. 2) and three of the second set of planet gears 70 (only one is shown in FIG. 2). Each of the first set of planet gears 68 includes a small diameter set of gear teeth 68a and a large diameter set of gear teeth 68b. The small diameter set of gear teeth 68a mesh with the external gear teeth 52b of the first sun gear 52. The large diameter set of gear teeth 68b of the first sun gear 52 mesh with internal gear teeth 74a of the first ring gear 74.

Each of the second set of planet gears 70 includes a small diameter set of gear teeth 70a, an intermediate diameter set of gear teeth 70b and a set of large diameter set of gear teeth 70c. The small diameter set of gear teeth 70a mesh with the external gear teeth 54b of the second sun gear 54 and internal gear teeth 76a of the second ring gear 76. The intermediate diameter set of gear teeth 70b mesh with the external gear teeth 56b of the third sun gear 56. The large diameter set of gear teeth 70c mesh with the external gear teeth 58b of the fourth sun gear 58.

The pawl 72 is retained in a portion of the small diameter portion 100 of the carrier 66 in a conventional manner. The pawl 72 acts as a one way clutch for the transmission of torque from the carrier 66 to the hub shell 22.

The first ring gear 74 is an annular member that encircles the first planet gears 68, a portion of the large diameter portion 100 of the carrier 66 and the pawl 18. The first ring gear 74 is rotatable relative to the axle 20, the hub shell 22 and the carrier 66. The first ring gear 74 includes the internal gear teeth 74a and a plurality of internal ratchet teeth 74b. The internal gear teeth 74a mesh with the large diameter gear teeth 68b of the first planet gears 68. The internal ratchet teeth 74b are configured for engagement with the pawl 18. With the pawl 18 operable, the pawl 18 acts as a one way clutch that allows the first ring gear 74 to rotate in only one direction relative to the driver 46, as described below.

The second ring gear 76 is coupled to the right cup 30 and hence to the hub shell 22 via a one-way clutch in the form of a roller clutch 114 having a plurality of conventional rollers and cam surfaces.

As best shown in FIG. 3, the control arm 78 includes three arcuate control portions 78a, 78b and 78c. The control portion 78a is configured to control operation of the second sun gear pawl 60. The control portion 78b is configured to control operation of the third sun gear pawl 62. The control portion 78c is configured to control operation of the fourth sun gear pawl 64. Operation of the control arm 78, and sun gear pawls 60, 62 and 64 is conventional. A more detailed description of operation of the control arm 78 is provide in, for example, U.S. Pat. No. 6,607,465 to Shoge (assigned to Shimano Inc.). For the sake of brevity, further description of the operation of the control arm 78 is omitted.

A description of the pawl retracting mechanism 16 is provided with specific reference to FIGS. 6-12. The pawl retracting mechanism 16 basically includes a ring member 140 and a slide spring 142. The ring member 140 is an annular ring shaped element that includes a pair of projections 144 and a recess 146.

The slide spring 142 includes a straight end 150, a wire portion 152 and a bent end 154. The straight end 150 and the wire portion 152 extend along and contact the first ring gear 74 on the annular surface adjacent to the internal ratchet teeth 74b, as indicated in FIG. 12. The bent end 154 is inserted in the recess 146 of the ring member 140 of the pawl retracting mechanism 16. Specifically, the bend end 154 of the slide spring 142 is fixed to the ring member 140 via the recess 146.

The pawl 18 is a conventional pawl member that is spring biased radially outward by springs 160. The pawl 18 and the spring 160 are disposed in the recess 46b of the driver 46.

A description of the operation of the pawl retracting mechanism 16 is now provided with specific reference to FIGS. 6-12. As mentioned above, torque is transmitted along any one of the first group of power transmission paths or the second group of power transmission paths. The pawl 18 is configured to transfer torque between the driver 46 and the hub shell 22 thereby defining a basic characteristic of each path of the first group of power transmission paths. The ring member 140 (a pawl retracting member) is configured to retract the pawl 18 (away from engagement with the first ring gear 74) with torque transmitted through the second group of power transmission paths. Specifically, the ring member 140 (the pawl retracting member) includes the slide spring 142 which is configured to urge the ring member 140 into engagement with the pawl 180 with torque transmitted through any of the second group of power transmission paths. The slide spring 142 is disposed between the driver 46 and the first ring gear 74, and the second end 154 of the slide spring 142 is connected to the ring member 140. More specifically, the slide spring 142 is sandwiched between the first ring gear 74 and the ring member 140.

Figure 8:
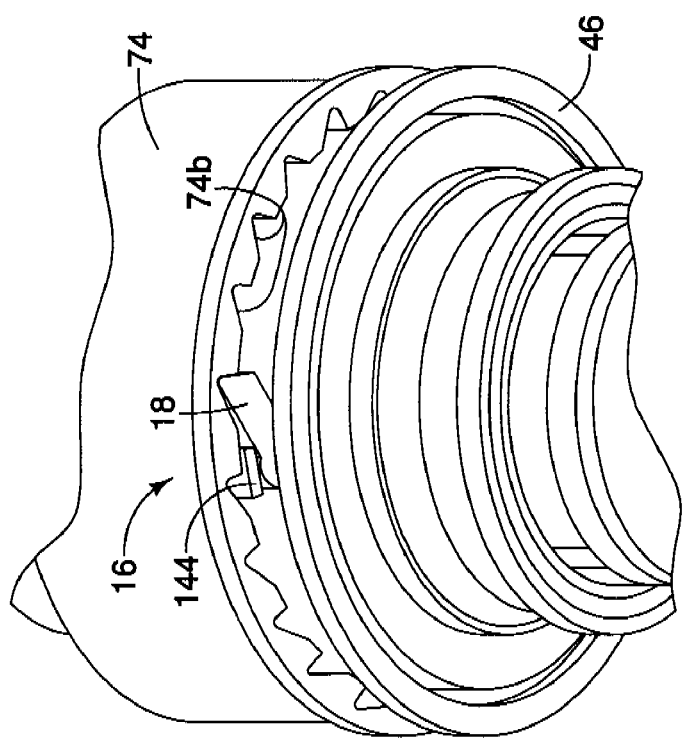
FIG. 8 is a perspective view of a portion of the power transmission assembly showing the pawl retracting mechanism in the dis-engaged position and the pawl in the torque transmitting position corresponding to FIG. 6 in accordance with one embodiment of the present invention.
Figure 10:
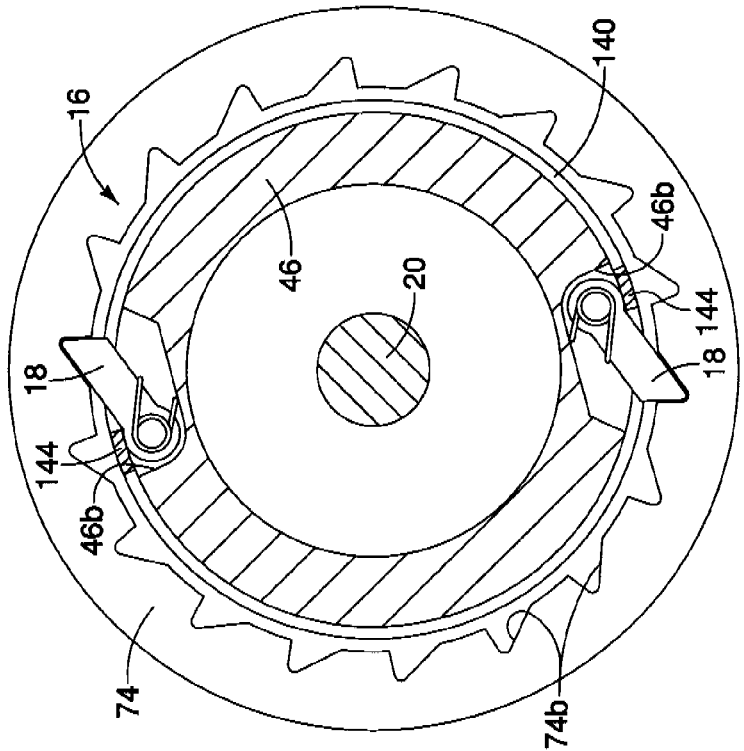
FIG. 10 is a cross-sectional view of the portion of the power transmission assembly taken along the line 10-10 in FIG. 6, showing the pawl retracting mechanism in the dis-engaged position and the pawl in the torque transmitting position corresponding to FIGS. 6 and 8 in accordance with one embodiment of the present invention.

With the clutch ring 48 disengaged from the carrier 66 as shown in FIGS. 2, 6 and 13-16 (the first group of power transmission paths), the pawls 18 are biased into engagement with the internal ratchet teeth 74b of the first ring gear 74 by the springs 160, as indicated in FIGS. 6, 8 and 10. Torque is transmitted from the driver 46 through the pawls 18 to the first ring gear 74.

Figure 9:
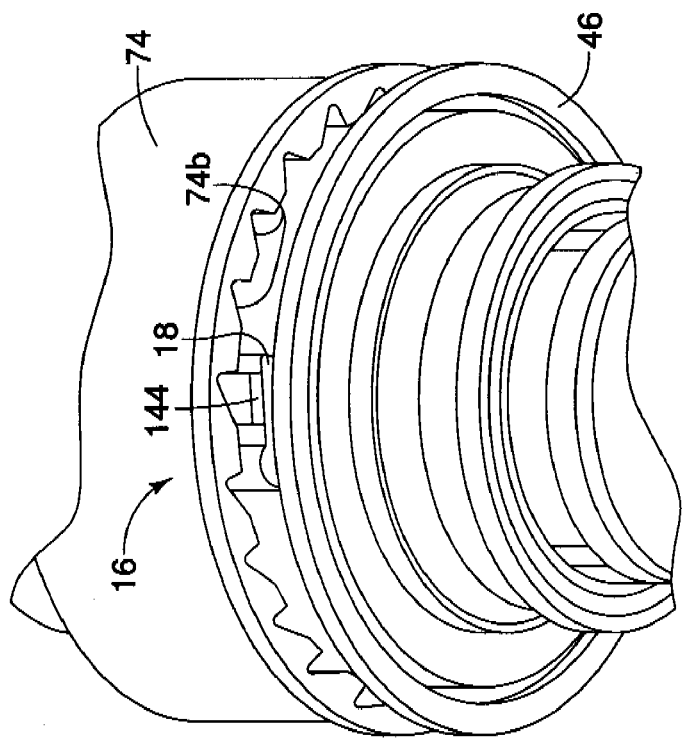
FIG. 9 is a perspective view of a portion of the power transmission assembly showing the pawl retracting mechanism in the engaged position and the pawl in the retracted position corresponding to FIG. 7 in accordance with one embodiment of the present invention.
Figure 11:
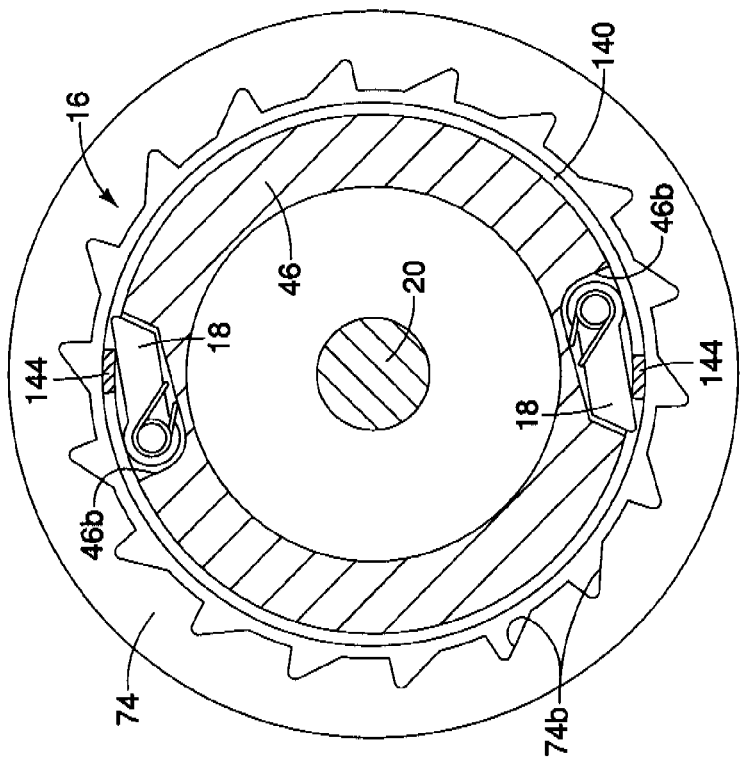
FIG. 11 is a cross-sectional view of a portion of the power transmission assembly taken along the line 11-11 in FIG. 7 showing the pawl retracting mechanism in the engaged position and the pawl in the retracted position corresponding to FIGS. 7 and 9 in accordance with one embodiment of the present invention.

With the clutch ring 48 engaged with the recess 110 in the larger diameter portion 102 of the carrier 66 as shown in FIGS. 7 and 17-20 (the second group of power transmission paths), the carrier 66 and the driver 46 rotate together as a single body. The planet gears 68 rotate with the carrier 66. As the planet gears 68 rotate with the carrier 66, the gear teeth 68b engaging the gear teeth 74a causing the first ring gear 74 to rotate at a speed greater than the rotational speed of the driver 46. Consequently, the slide spring 142 is tensioned by friction from contact with the first ring gear 74 thereby urging the ring member 140 to move the projections 144 into contact with the pawls 18 as shown in FIGS. 7, 9 and 11. As a result, the pawls 18 are moved to the retracted position and are completely disengaged from the internal ratchet teeth 74b of the first ring gear 74. Therefore, in the retracted position, the pawls 18 are silenced.

To further understand the operation of the hub assembly 12 and the power transmission assembly 14, the following description is provided with specific reference to FIGS. 13-20. In the power transmission assembly 14, there are eight different speeds (gear ratios) or power transmission paths possible for transmitting torque from the chain sprocket 92 to the hub shell 22. The desired speed is selected by a cyclist via a gear selector (not shown) that is connected by cable or other mechanism to the control arm 78 and the shift assist mechanism 50 in a conventional manner. Movement of the control arm 78 activates or engages one or more of the pawls 60, 62 or 64 in a conventional manner. The shift assist mechanism 50 engages and dis-engages the clutch ring 48 in a conventional manner.

FIGS. 13-16 are similar to FIG. 2 in that the various components of the power transmission assembly 14 are depicted. FIGS. 13-16 further show the four examples of speeds or gear ratios possible with torque transmitted. In each of FIGS. 13-16, the members of the power transmission assembly 14 used to transmit torque have a thick black line extending therethrough, thereby defining that particular power transmission path. The speeds shown in FIGS. 13-16 represent first power transmission paths. The first power transmission paths are defined as those speeds or gear ratios in which torque is transmitted from the driver 46 to the first ring gear 74 via the pawls 18. The first power transmission paths or speeds 1, 2, 3 and 4, are described below.

FIGS. 17-20 are similar to FIG. 2 in that the various components of the power transmission assembly 14 are depicted. In each of FIGS. 17-20, the members of the power transmission assembly 14 used to transmit torque have a thick black line extending therethrough, thereby defining that particular power transmission path. In FIGS. 17-20, the clutch ring 48 is engaged with the recess 110 of the carrier 66 such that the driver 46 and the carrier 66 rotate together. The speeds shown in FIGS. 17-20 represent second power transmission paths and correspond to speeds or gear ratios in which torque is transmitted from the driver 46 directly to the carrier 66 via the clutch ring 48. The second power transmission paths or speeds 5, 6, 7 and 8, are described below.

The status (disengaged/engaged and free to rotate/locked in position) of the various components for each speed is shown in Table 1, and the component combinations for speed is shown in Table 2:

TABLE 1

| Speed | Clutch ring 48 | Sun Gear 54 | Sun Gear 56 | Sun Gear 58 | Gear Ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Free | Free | 0.85 |
| 5 | Engaged | Free | Free | Free | 1.0 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Speed | Component Combinations |
|---|---|
| 1 | Driver 46 → Pawl 18 → First ring gear 74 → Carrier 66 (first planet gear 68 rotates around first sun gear 52) → Pawl 72 → Hub shell 22 |
| 2 | Driver 46 → Pawl 18 → First ring gear 74 → Carrier 66 (first planet gear 68 rotates around first sun gear 52 and second planet gear 70 rotates around fourth sun gear 58) → Second ring gear 76 → Roller clutch 114 → Hub shell 22 |
| 3 | Driver 46 → Pawl 18 → First ring gear 74 → Carrier 66 (first planet gear 68 rotates around first sun gear 52 and second planet gear 70 rotates around third sun gear 56) → Second ring gear 76 → Roller clutch 114 → Hub shell 22 |
| 4 | Driver 46 → Pawl 18 → First ring gear 74 → Carrier 66 (first planet gear 68 rotates around first sun gear 52 and second |

TABLE 2-continued

| Speed | Component Combinations |
|---|---|
|  | planet gear 70 rotates around second sun gear 54) → Second ring gear 76 → Roller clutch 114 → Hub shell 22 |
| 5 | Driver 46 → Clutch ring 48 → Carrier 66 → Pawl 72 → Hub shell 22 |
| 6 | Driver 46 → Clutch ring 48 → Carrier 66 (second planet gear 70 rotates around fourth sun gear 58) → Second ring gear 76 → Roller clutch 114 → Hub shell 22 |
| 7 | Driver 46 → Clutch ring 48 → Carrier 66 (second planet gear 70 rotates around third sun gear 56) → Second ring gear 76 → Roller clutch 114 → Hub shell 22 |
| 8 | Driver 46 → Clutch ring 48 → Carrier 66 (second planet gear 70 rotates around second sun gear 54) → Second ring gear 76 → Roller clutch 114 → Hub shell 22 |

A more detailed description of the speeds represented in Table 2 is now provided. In the first speed (speed 1—one of the first torque transmission paths), torque from the chain sprocket 92 to the driver 46 is transmitted to the first ring gear 74 by the pawls 18. The first ring gear 74 causes the first planet gears 68 to rotate about the fixed first sun gear 52, which in turn cause the carrier 66 to rotate. The carrier 66 then causes the hub shell 22 to rotate via the pawl 72.

In the second speed (speed 2—one of the first torque transmission paths) of the first torque transmission path, torque from the chain sprocket 92 to the driver 46 is transmitted to the first ring gear 74 by the pawls 18. The first ring gear 74 causes the first planet gears 68 to rotate about the fixed first sun gear 52, which in turn cause the carrier 66 to rotate. However, now the fourth sun gear 58 is locked in position by the fourth sun gear pawl 64 (one way rotation). Therefore, the second planet gear 70 rotates about the fourth sun gear 58. The second ring gear 76 is rotated by the second planet gear 70. The second ring gear 76 now causes the hub shell 22 to rotate via the roller clutch 114.

In the third speed (speed 3—one of the first torque transmission paths), torque from the chain sprocket 92 to the driver 46 is transmitted to the first ring gear 74 by the pawls 18. The first ring gear 74 causes the first planet gears 68 to rotate about the fixed first sun gear 52, which in turn cause the carrier 66 to rotate. The second planet gear 70 now rotates around the third sun gear 56 which is locked in position by the third sun gear pawl 62. Rotation of the second planet gear 70 again causes the second ring gear 76 to rotate. The second ring gear 76 causes the hub shell 22 to rotate via the roller clutch 114.

In the fourth speed (speed 4—one of the first torque transmission paths), torque from the chain sprocket 92 to the driver 46 is transmitted to the first ring gear 74 by the pawls 18. The first ring gear 74 causes the first planet gears 68 to rotate about the fixed first sun gear 52, which in turn cause the carrier 66 to rotate. The second planet gear 70 now rotates around the second sun gear 54 which is locked in position by the second sun gear pawl 60. Rotation of the second planet gear 70 again causes the second ring gear 76 to rotate. The second ring gear 76 causes the hub shell 22 to rotate via the roller clutch 114.

In the fifth speed (speed 5—one of the second torque transmission paths), the clutch ring 48 now directly couples the driver 46 to the carrier 66. The first ring gear 74 rotates at speeds greater than the driver 46 and the pawl retracting mechanism 16 retracts the pawls 18. In the fifth speed, the carrier 66 causes the hub shell 22 to rotate via the pawl 72.

In the sixth speed (speed 6—one of the second torque transmission paths), torque is transmitted from the driver 46 to the carrier 66 via the clutch ring 48. The fourth sun gear 58 is locked in position by the fourth sun gear pawl 64 (one way rotation). Therefore, the second planet gear 70 rotates about the fourth sun gear 58. The second ring gear 76 is rotated by the second planet gear 70. The second ring gear 76 now causes the hub shell 22 to rotate via the roller clutch 114.

In the seventh speed (speed 7—one of the second torque transmission paths), torque is transmitted from the driver 46 to the carrier 66 via the clutch ring 48. The second planet gear 70 now rotates around the third sun gear 56 which is locked in position by the third sun gear pawl 62. Rotation of the second planet gear 70 again causes the second ring gear 76 to rotate. The second ring gear 76 causes the hub shell 22 to rotate via the roller clutch 114.

In the eighth speed (speed 8—one of the second torque transmission paths), torque is transmitted from the driver 46 to the carrier 66 via the clutch ring 48. The second planet gear 70 now rotates around the second sun gear 54 which is locked in position by the second sun gear pawl 60. Rotation of the second planet gear 70 again causes the second ring gear 76 to rotate. The second ring gear 76 causes the hub shell 22 to rotate via the roller clutch 114.

As set forth above, speeds 1-4 are of the first group of power transmission paths. However, it should be understood that the first group of power transmission paths can alternatively include only one speed (one gear ratio) or can include several speeds. Similarly, speeds 5-8 are of the second group of power transmission paths. However, it should be understood that the second group of power transmission paths can alternatively include only one speed (one gear ratio) or can include several speeds.

The actual number of speeds is variable as long as at least two speeds are provided in the power transmission assembly 14, with one speed having torque transmitted by a pawl and the other speed where the torque bypasses the pawl and the pawl is retracted and silenced.

In the depicted embodiment, the pawl retracting mechanism 16 can be installed in any of a variety of power transmission assemblies, such as the power transmission assembly 14 described above. Moreover, in the first power transmission path the pawls 18 are used to transmit torque to the hub shell 22. In the second power transmission path, the pawls 18 are not used to transmit torque and the pawl retracting mechanism 16 retracts the pawls 18. Since the first ring gear 74 rotates at a speed greater than the driver 46 with torque transmitted along the second power transmission path, the pawls 18 being retracted are silenced.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A multi-speed internal bicycle hub transmission assembly comprising:
    a hub axle;
    a driver rotatably supported to the hub axle;
    a hub shell rotatably supported to the hub axle; and
    a power transmission mechanism disposed between the driver and the hub shell for communicating rotational power from the driver to the hub shell through at least a first power transmission path and a second power transmission path;
    a pawl configured to transfer torque between the driver and the hub shell with torque being transferred along the first power transmission path; and
    a pawl retracting member configured to restrict movement of the pawl with torque transmitted through the second power transmission path, the pawl retracting member including a slide spring configured to urge the pawl retracting member into engagement with the pawl with torque transmitted through the second power transmission path.

2. The multi-speed internal bicycle hub transmission assembly according to claim 1, wherein
    the power transmission mechanism further includes
        a sun gear;
        a ring gear with ratchet teeth rotatably supported around the hub axle;
        a planet gear carrier rotatably supported around the hub axle; and
        a plurality of first planet gears rotatably supported to the planet gear carrier and meshing with the sun gear and the ring gear; and
    the pawl being disposed between the driver and the ring gear.

3. The multi-speed internal bicycle hub transmission assembly according to claim 2, wherein
    torque is transferred from the driver to the ring gear via the pawl in the first power transmission path, and
    torque is transferred from the driver to the planetary gear carrier in the second power transmission path.

4. The multi-speed internal bicycle hub transmission assembly according to claim 3, wherein
    the slide spring is disposed between the driver and the ring gear, and one end of the slide spring is connected to the pawl retracting member.

* * * * *